United States Patent [19]

Cronan

[11] Patent Number: 4,469,229

[45] Date of Patent: Sep. 4, 1984

[54] CONVEYING APPARATUS

[76] Inventor: Walter I. Cronan, 125 Lakeview Ave., Leonia, N.J. 07605

[21] Appl. No.: 368,681

[22] Filed: Apr. 15, 1982

[51] Int. Cl.³ .................. B07C 5/02; B65G 47/24; B65G 11/10

[52] U.S. Cl. .................................. 209/544; 193/46; 193/417; 209/668

[58] Field of Search ............ 209/539, 540, 544, 621, 209/659, 660, 662, 667, 668, 670, 673; 193/25 AC, 25 FT, 46; 198/417

[56] References Cited

U.S. PATENT DOCUMENTS

| | | | |
|---|---|---|---|
| 788,618 | 5/1905 | Widney | 209/662 |
| 1,193,624 | 8/1916 | Small | 193/46 |
| 2,425,478 | 8/1947 | Lawton et al. | 209/668 |
| 2,439,075 | 4/1948 | Christiansen | 198/417 |
| 2,529,603 | 11/1950 | Galt | 193/46 X |
| 2,564,143 | 8/1951 | Alsup | 193/46 |
| 2,662,631 | 12/1953 | Kraus et al. | 198/417 X |
| 2,947,401 | 8/1960 | Schuricht et al. | 193/25 FT |
| 3,260,364 | 7/1966 | England | 209/668 |
| 3,661,257 | 5/1972 | Hall et al. | 209/662 |
| 3,837,452 | 9/1974 | Schuricht | 193/25 FT X |
| 3,874,508 | 4/1975 | Cronan | 209/668 |

FOREIGN PATENT DOCUMENTS 341269 9/1921 Fed. Rep. of Germany ...... 209/670
164097 9/1933 Switzerland ...................... 209/670

Primary Examiner—Robert B. Reeves
Assistant Examiner—Edward M. Wacyra
Attorney, Agent, or Firm—Darby & Darby

[57] ABSTRACT

A track for conveying workpieces of predetermined size and shape is disclosed, in which a plurality of elongated filaments are aligned parallel to each other in a predetermined spatial relationship according to the size and shape of the workpieces, so that a passageway is created along the length of the track through which the workpieces may travel while they are captured by the filaments. The track includes a plurality of alignment frames spaced along the length of the filaments, the number of frames being dependent on the length of the filaments and the desired amount of curvature of the track along its length. Each alignment frame includes a plate with a plurality of arms adjustably mounted relative to the plate, each of the arms having at least one filament retaining channel on its periphery. The channel is shaped to slidably engage a corresponding one of the filaments along a portion of the filament's length while retaining the filament in the channel. Also disclosed is a variation of the above-described track, in which one of the filaments extends past the end of the track, for use as a stabilizing guide member for workpieces travelling along the rollers of a classifying machine fed by the track.

12 Claims, 13 Drawing Figures

CONVEYING APPARATUS

BACKGROUND OF THE INVENTION

This invention relates generally to conveying devices of the type used to move workpieces from a feeding to a receiving apparatus in a desired orientation.

In mechanical processing operations such as machining, inspection or the assemblying of parts, tracks are frequently used to transport a given part, or workpiece, from one apparatus to another. For example, a vibratory feeder may be used to organize a collection of workpieces into a continuous stream for inspection by a machine which classifies the workpieces according to their size. In order to transport the workpieces from the vibratory feeder's outlet to the classifying machine in the desired orientation for measurement, the two machines are connected by a track which is designed according to the particular shape and size range of the workpieces.

Currently available track designs are substantially rigid structures, typically utilizing truss or sheet metal construction for the supporting framework. Handmade or custom molded channels attached to the framework are used for guiding the workpieces in a desired orientation between the feeding and receiving apparatus. Such tracks are complex structures which cannot be mass produced, having many parts which must be individually designed or constructed for a single purpose application. Assembly of the structure typically requires extensive welding or soldering, which is both costly and time consuming. Furthermore, the structure cannot thereafter be easily disassembled for routine maintenance and replacement of parts. The resulting structure is therefore expensive to build and service.

Some of the disadvantages of channel-type tracks have been alleviated by the use of so-called wire guide tracks, in which the track structure comprises a number of rigid wires arranged parallel to each other in a fixed lateral relationship according to the size and shape of a workpiece to be conveyed by the track. The wires are welded to a number of alignment frames which hold the wires in fixed position relative to each other, and the resulting track is held rigid by a supporting framework. While such structures may be simpler to design than channel-type tracks, their rigid, welded construction and supporting framework still result in high construction and maintenance costs. Further, the design of such wire tracks to date has not permitted workpieces carried by the track to be rotated from one angular orientation to another (viewed in a plane normal to the workpiece's direction of travel) as the workpiece moves along the track. Such rotation must be performed by channel-type tracks external to the wire track, thus limiting the wire track's usefulness.

In addition to the high cost of prior art tracks, several other disadvantages arise from their rigid structures. Once a track is designed to interconnect a particular feeding apparatus with a receiving apparatus, the geometry of the track is set and the two connected apparatus cannot thereafter be shifted relative to each other without redesigning the track. Further, when a rigid track is intended for use with a vibratory feeder, the track may not be directly attached to the feeder without damping the feeder's vibration, thus requiring mechanical isolation of the feeder from the track. This not only complicates the transfer of workpieces from the vibratory feeder to the track, but also prevents the utilization of the feeder's vibration for freeing jammed workpieces in the track. Instead, separate accelerators may be required to help move workpieces through the track, thus adding to the cost, complexity and maintenance requirements of the structure.

OBJECTS OF THE INVENTION

It is a broad object of this invention to provide an improved track structure which addresses the above mentioned deficiencies.

It is another object to provide such a track which may be adjusted to accommodate any one of a wide variety of differently shaped workpieces;

It is a further object to provide a flexible track which is easily constructed and inexpensive to maintain.

These and other objects and features will become apparent from the following description of the preferred embodiments of the present invention.

SUMMARY OF THE INVENTION

According to the invention, a structure is provided in which a plurality of wires or like filaments may be aligned parallel to each other in a predetermined spatial relationship according to the size and shape of a predetermined workpiece, to form a track for conveying such workpieces.

In one aspect of the invention, a track is provided in which the filaments are aligned so as to define a passageway which captures the workpieces in a desired angular orientation while permitting the workpieces to slide on the filaments along the length of the track. The track is twisted along its length so that the passageway rotates or spirals, causing a change in the angular orientation of workpieces traveling through the channel.

In another aspect of the invention, a track having flexible, resilient filaments is provided in which the track is adapted for direct mounting to a vibrating apparatus, such as a vibratory feeder. The track is flexibly suspended between the vibrating apparatus and a second mounting point, spaced a sufficient distance from the first mounting point to permit operation of the vibrating apparatus without substantial damping by the track.

A further aspect of the invention is a track having a plurality of filaments held in parallel, spaced-apart relationship by a plurality of alignment frames. The frames each have a plurality of filament-retaining channels, each channel shaped to slidably engage a corresponding filament while retaining the filament in the channel.

Yet another aspect of the invention is an alignment frame which may be used with a plurality of filaments to construct a track. The frame is shaped to form a passageway through which workpieces can travel while sliding on the filaments. The frame has a plurality of filament-retaining channels aligned substantially parallel to each other and spaced at predetermined points about the passageway according to the size and shape of a workpiece to be conveyed. Each channel has a cross-sectional shape and size selected to slidably retain a corresponding filament along a portion of the filament's length while fixing the filament's lateral placement relative to the other filament-retaining channels.

A further aspect of the invention is a combination track and guide member for a roller-type classifying machine. A track having a plurality of parallel filaments aligned in a predetermined spatial relationship is provided for transporting workpieces to or from the classifying machine. One of the filaments is extended past the end of the track and tensioned between the rollers of the classifying machine at a position where it provides vertical support to workpieces traveling along the rollers, thus stabilizing the seating of workpieces on the rollers.

BRIEF DESCRIPTION OF THE DRAWINGS

FIG. 3 is a sectional view along line 3—3 of FIG. 1, showing the angular orientation of a T-shaped workpiece as it leaves the track and transfers onto the input rails of the classifying machine.

FIG. 6 is a sectional view along line 6—6 of FIG. 5, illustrating the use of a filament as a guide member for a workpiece traveling along the rollers of a classifying machine.

DESCRIPTION OF THE PREFERRED EMBODIMENT

Figure 1:
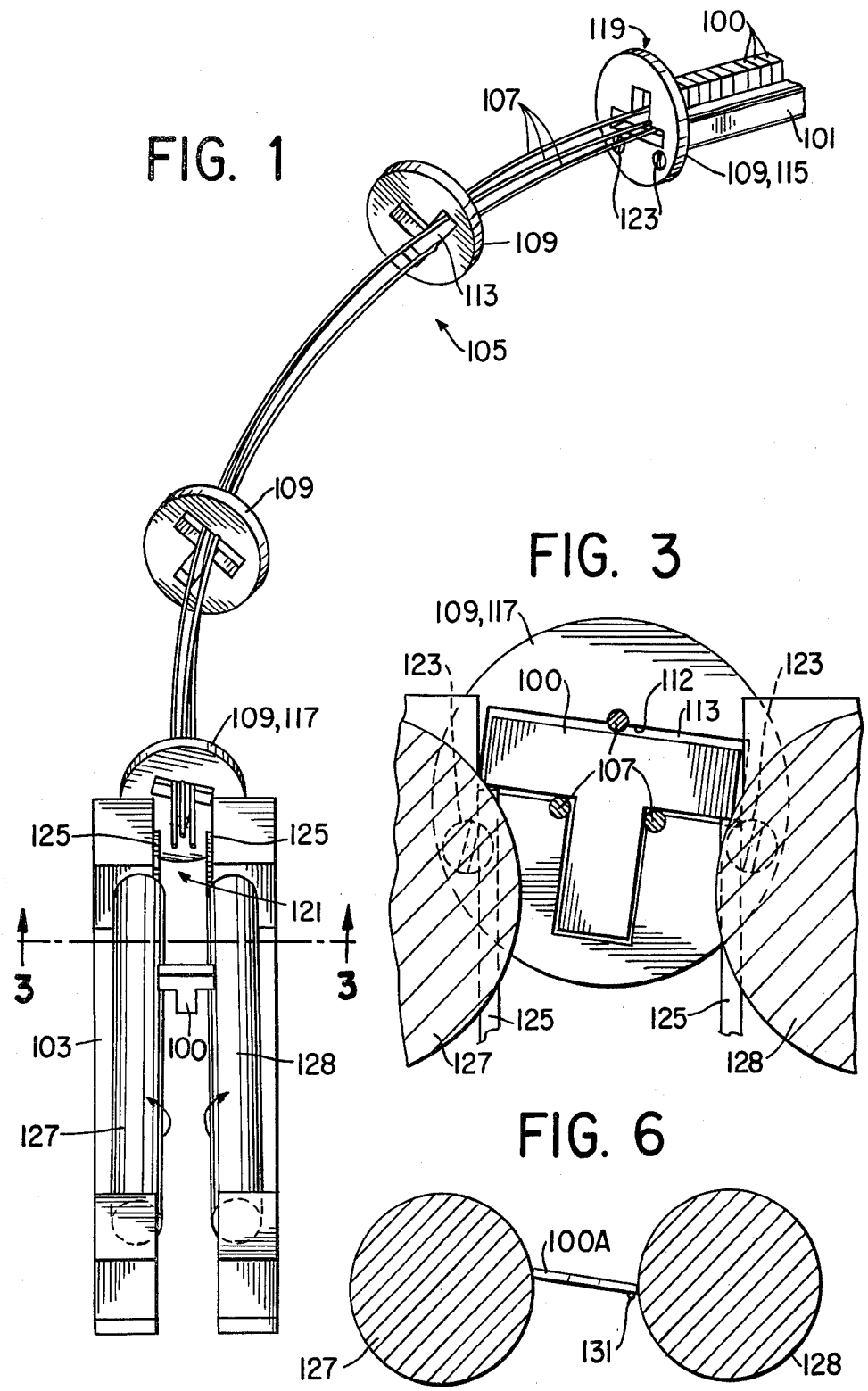
FIG. 1 is a perspective view of a track according to the present invention, mounted between a vibratory feeder and a classifying machine.

Referring now to the details of the drawing, FIG. 1 shows an embodiment of the invention adapted for use with a workpiece of predetermined size and shape, such as the T-shaped workpiece 100. The drawing illustrates workpieces 100 being fed from a vibratory feeder 101 to a classifying machine 103 via a flexible transporting device or track 105.

Figure 2:
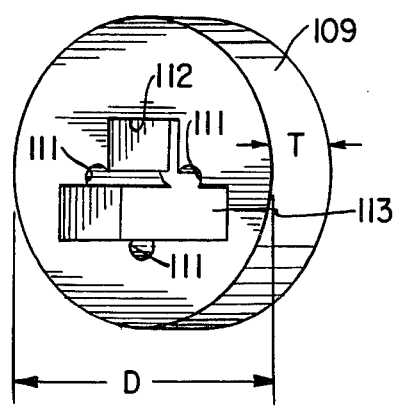
FIG. 2 is a perspective view of an alignment frame used in constructing the track of FIG. 1.

Track 105 comprises three resilient filaments 107 held substantially parallel with a predetermined spatial or lateral relationship to each other by a plurality of alignment frames 109. As seen in FIG. 2, frames 109 may each comprise a machined disc of diameter D and thickness T, preferably machined from a solid block of aluminum. Each alignment frame 109 has a plurality of filament retaining channels 111, which are designed to slidably engage a corresponding plurality of filaments 107 and hold the filaments parallel to each other in a predetermined spatial relationship. In the embodiment of FIG. 1, three filament retaining channels 111 are used to hold filaments 107 parallel to each other in a triangular relationship, so that a T-shaped workpiece 100 may slide along the path created by the parallel filaments while being oriented to a desired position in a plane normal to the workpiece's direction of travel. Channels 111 are disposed about the border of a T-shaped opening 112 in frame 109, the opening being dimensioned to permit workpiece 100 to travel therethrough. With filaments 107 inserted in their respective channels about the border of opening 112, the T-shaped workpiece 100 traveling through track 105 "sees" a passageway 113 through frame 109 which is defined by the size and shape of opening 112 less the amount by which filaments 107 extend into the opening 112. Workpieces may thus slide along the filaments 107 in track 105 and pass through opening 112 in a given alignment frame 109 without encountering any discontinuities in the sliding surfaces of the filaments.

Channels 111 preferably have a C-shaped cross-section, enabling them to slidably engage a filament 107 having a circular cross-section, such as a hardened steel piano wire, while the unengaged portion of the wire's circumference provides a sliding surface for workpiece 100 as it moves through opening 113. Preferably about three-fifths of the circumference of the filament 107 is engaged by the walls of channel 111, providing enough circumferential enclosure of the filament to prevent it from radially popping out of the channel while exposing two-fifths of the filament's circumference for sliding contact with workpieces 100.

Track 105 is constructed by cutting the three filaments 107 to the desired track length and threading them in a parallel configuration through the three corresponding channels 111 in a plurality of alignment frames 109. The number of alignment frames 109 needed for a particular application depends on the length of track 105 and the amount of spiral or twist in the passageway 113 defined by filaments 107 and alignment frames 109. A sufficient number of frames 109 should be provided to maintain the same lateral relationship of filaments 107 at every point along the length of track 105. Frames 115 and 117 at either end of track 105 may then be attached respectively to the outlet end 119 of a feeding apparatus such as vibratory feeder 101 and to the inlet end 121 of a receiving apparatus such as classifying machine 103. Conventional fasteners such as screws 123 may be used to attach end frames 115 and 117 to outlet and inlet ends 119 and 121, without fear of damping the motion of vibratory feeder 101. Outlet end 119 is preferably elevated with respect to inlet end 121, so that workpieces may be gravity-fed along track 105 from vibratory feeder 101 to classifying machine 103.

As seen in FIG. 1, track 105 is flexibly suspended between the feeding and receiving apparatus 101 and 103, without need for an additional supporting framework. The flexibility and resiliency of filaments 107 and the lack of a rigid supporting framework thus provides a track structure which may be easily flexed or vibrated while mounted in place, and still maintain a predetermined parallel alignment among the filaments.

A distinct advantage to the present invention is the ability of track 105 to control the angular orientation of workpieces 100 traveling therethrough, i.e., the orientation of the workpieces in a plane normal to their direction of travel. If the angular orientation of workpieces 100 is different at outlet end 119 of feeder 101 than the desired angular orientation of the workpieces when they enter the input end 121 of classifying machine 103, track 105 may be longitudinally twisted and endplates 115 and 117 oriented to accomodate the desired inlet and outlet orientations.

As the degree of longitudinal twist in a given length of track 105 increases, a greater number of frames 109 should be provided to ensure substantially parallel spacing of filaments 107 and thus prevent binding of the workpieces 100 as they move through the track.

In operation, vibratory feeder 101 provides a steady stream of workpieces 100 to its outlet end 119. Workpieces 100 are then sequentially fed onto the filaments 107 of track 105 in a predetermined angular orientation, such as the upside down orientation of the T-shaped workpieces 100 illustrated in FIG. 1. Workpieces 100 then slide along the exposed surfaces of filaments 107 and are rotated to a new angular orientation as they spiral along the longitudinally twisted track 105. They leave track 105 and transfer to input rails 125 in the desired orientation for travel along the rollers 127 and 128 of classifying machine 103, as seen in FIGS. 1 and 3.

The flexible skeletal structure of track 105 gives rise to many advantages not found in presently available track structures. In contrast to the rigid tracks of the prior art, which must be isolated from vibratory feeders to avoid undesirable damping of the feeder's vibration, track 105 may be attached directly to feeder 101. The resiliency of filaments 107 in track 105 allows the track to vibrate with feeder 101, thus taking advantage of the feeder's motion to help workpieces 100 slide more freely through the track. Further, the flexibility of track 105 allows feeding and receiving apparatus 101 and 103 to be shifted relative to each other without disconnecting and realigning the track, and also permits compact shipping and storage of an assembled track by bending it to fit inside a shipping container.

Another advantage is provided by the sliding fit of filaments 107 in channels 111, which permits simple construction of track 105, rapid replacement of friction worn filaments, and interchangeability of parts from other tracks. In addition, the length or degree of twist in track 105 may be quickly increased by inserting longer filaments 107 and/or varying the number and longitudinal spacing of frames 109.

Figure 4A:
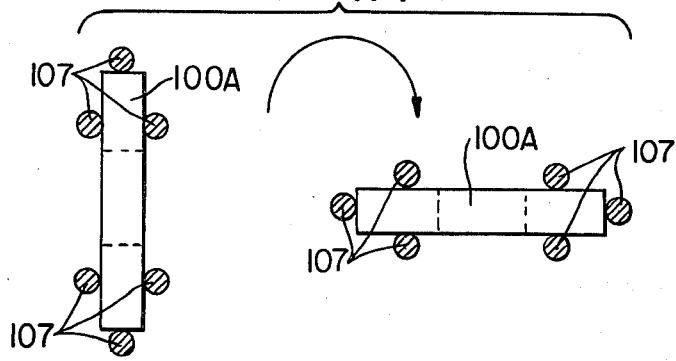
FIGS. 4a to 4d illustrate how a plurality of filaments may be arranged in a predetermined spatial relationship to capture a given workpiece and change its angular orientation.
Figure 4B:
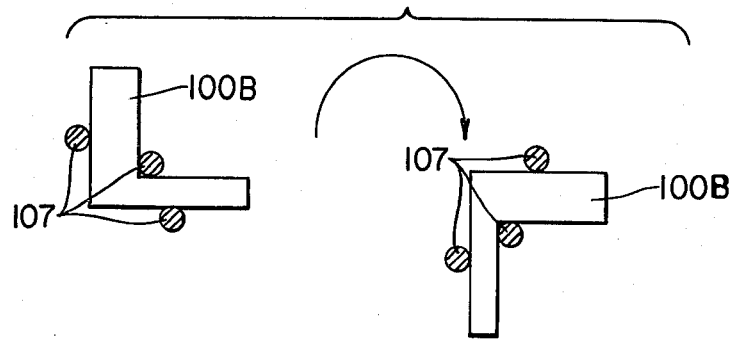
Figure 4C:
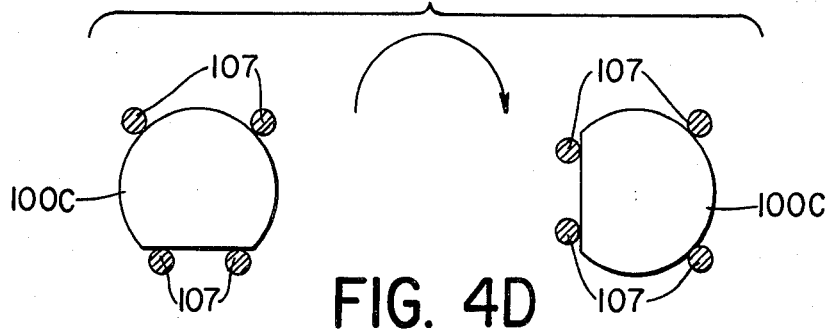
Figure 4D:
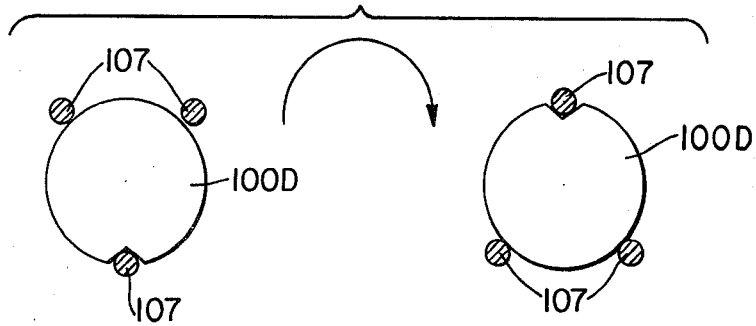

As seen in FIGS. 4A to 4D, the number and positioning of filaments 107 may be varied to "capture" one of a wide variety of differently shaped workpieces 100, allowing the given workpiece to slide longitudinally through track 105 while changing its angular orientation. As used in the specification, the word "capture" means to support a workpiece with a fixed angular orientation so that the movement of the workpiece at any given point along the track's length is restricted in a plane normal to its direction of travel, without clamping the workpiece or otherwise restricting its movement along the length of track 105. FIG. 4A illustrates a workpiece having a thin rectangular crosssection, such as a flat washer 100A traveling in a direction normal to the plane of the drawing. The figure illustrates how such a workpiece may be captured by six filaments 107 and rotated by the filaments through a 90 degree arc in the plane of the drawing (i.e., in the plane normal to its direction of travel). FIG. 4B similarly shows workpiece 100B with an L-shaped cross-section, captured by three filaments 107 and rotated through a 90 degree arc relative to its original angular orientation. FIG. 4C shows a workpiece 100C with a truncated circular cross-section, captured by four filaments 107 and rotated through a 90 degree arc. FIG. 4D illustrates a workpiece 100D having a grooved circular cross-section, captured by three filaments 107 and rotated 180 degrees from its original angular orientation. Those skilled in the art will recognize that an infinite number of configurations of filaments 107 may be achieved by appropriate design of an alignment frame 109, to capture and guide a particular shape of workpiece between two apparatus while controlling its angular orientation.

Figure 5:
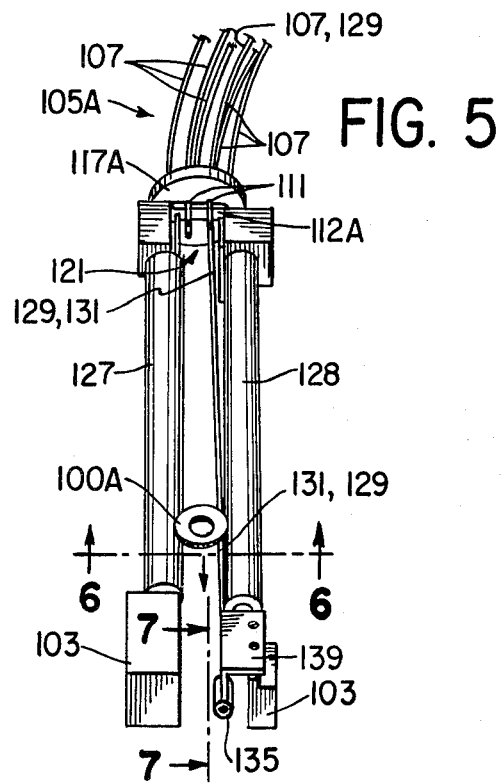
FIG. 5 shows an alternate embodiment of the invention, in which one of the track filaments is extended past the end of the track and serves as a guide member for a classifying machine.

FIG. 5 illustrates an alternate embodiment of the invention, in which extended filament 129 serves a dual purpose as one of the six filaments 107 in track 105A and as a guide member 131 for washers 100A traveling along rollers 127 and 128 of classifying machine 103. A classifying machine 103 and guide member 131 such as the one illustrated in FIG. 5 are described in detail in applicant's copending U.S. patent application Ser. No. 336,633 (hereinafter '633), filed Jan. 4, 1982, now U.S. Pat. No. 4,436,208, which is incorporated herein by reference.

As explained in the referenced application '633, rollers 127 and 128 of classifying machine 103 may be aligned to perform a size classification operation on workpieces such as washer 100A. The rollers are arranged in an oblique, or V-shaped configuration, with the distance between the rollers increasing as washer 100A travels along them from the inlet end 121 to the discharge end 133. If washer 100A reaches a point where the distance between rollers 127 and 128 is greater than the washer's diameter, it falls between the rollers into a classifying bin (not shown).

Since washers 100A are difficult to balance in a horizontal orientation between rollers 127 and 128, a guide member 131 comprising a tensioned filament or wire may be positioned as seen in FIGS. 5-8 to maintain washer 100A in a substantially horizontal orientation between the rollers. When washer 100A reaches the point where the roller separation is greater than the washer's diameter, the washer pivots about guide member 131 and falls into a classifying bin below the rollers.

Figure 7:
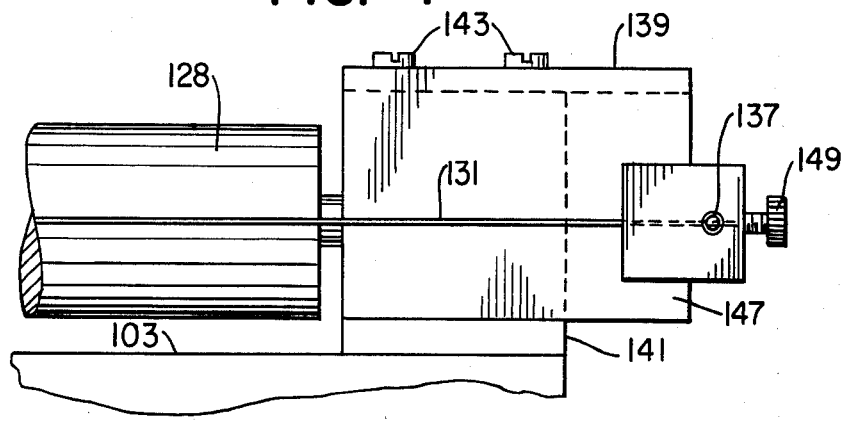
FIG. 7 is an enlarged elevational view along line 7—7 of FIG. 5, showing a preferred means for tensioning and positioning the guide member.
Figure 8:
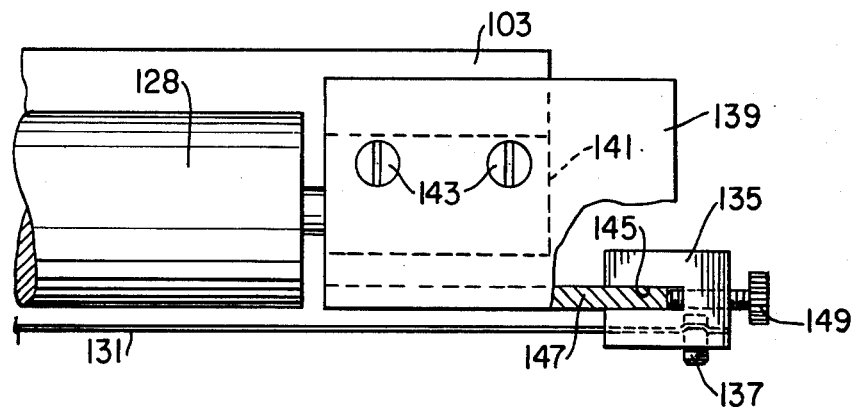
FIG. 8 is a plan view of the tensioning means of FIG. 7.

In the embodiment of FIGS. 5-8, six filaments 107 are positioned about a generally rectangular opening 112A in endframe 117A so as to capture and guide washer 100A along track 105A in the manner illustrated by FIG. 4A. However, instead of terminating all the filaments 107 at the inlet end of classifying machine 103 as in FIG. 1, one of these six filaments continues along the face of roller 128 and is fixed to cylindrical tension block 135, as by set screw 137 or the like. L bracket 139 is mounted on support block 141 of classifying machine 103 by screws 143, and cooperates with tension block 135 to transmit the tension of guide member 131 to the body of classifying machine 103. Tension block 135 is positioned on L bracket 139 as seen in FIGS. 7 and 8, with groove 145 straddling the vertical plate 147 of the L bracket. Thumbscrew 149 is threaded through an axial, tapped hole in tension block 135 and presses against the side of vertical plate 147, thereby tensioning guide member 131 and holding the tension block in place.

Since channels 111 in frame 117A ordinarily permit axial movement of filaments 107 through their respective channels, filament 129 is preferably fixed to end frame 117A, as by spot welding, to counteract the tensioning of guide member 131 by thumbscrew 149.

Figure 9:
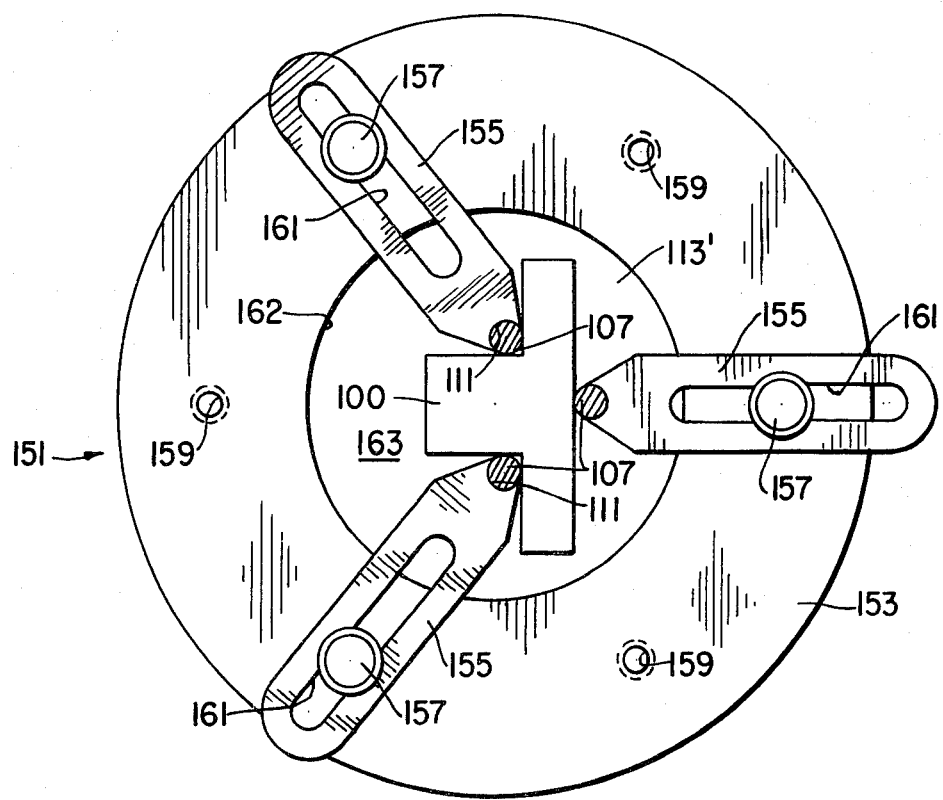
FIG. 9 is a plan view of an alternate embodiment of the alignment frame illustrated in the previous figures, shown with three filaments capturing a T-shaped workpiece.
Figure 10:
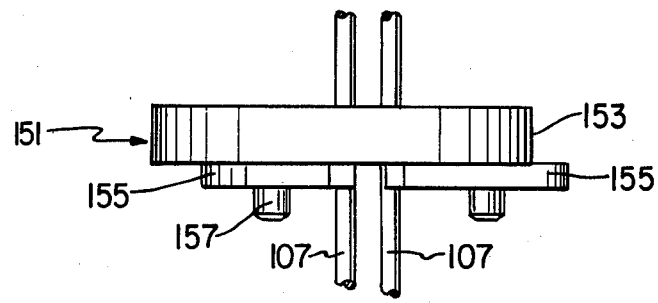
FIG. 10 is an elevational view of the alignment frame and filaments of FIG. 9.

FIGS. 9 and 10 illustrate an alternate embodiment of frame 109 of FIG. 2, which may be adjusted to capture a wide variety of differently shaped workpieces by arranging the spatial position of channels 111 and/or varying the number of channels to suit the size and shape of a given workpiece.

Alignment frame 151 comprises an annular plate 153 with a plurality of adjustable arms 155 each pivotally mounted to the plate by a screw 157 threaded in one of tapped holes 159. Plate 153 and arms 155 are preferably made of steel or other high tensile strength metal. A filament retaining channel 111 is formed at one end of adjustable arm 155, preferably with a C-shaped cross-section as described above in regard to the channels 111 in frame 109. Each arm 155 may include an elongated slot 161, dimensioned to receive set screw 157, for securing the arm to plate 153. The cooperation of slot 161 and pivotal screw 157 permits the corresponding channel 111 to assume a wide range of radial and circumferential positions relative to the pivot point of screw 157.

Frame 151 may be adjusted to fit a T-shaped workpiece 100 by loosening screws 157 and positioning the three arms 155 over the circular opening 162 defined by the inner circumference of plate 153, as seen in FIG. 9. Screws 157 are then tightened to fix arms 155 at the selected positions. As in the embodiment of FIG. 2, channels 111 are arranged parallel to each other in a predetermined lateral relationship to capture the T-shaped configuration of workpiece 100. However, alignment frame 151 permits the lateral relationship of channels 111 to be rearranged by changing the number and/or position of arms 155 to capture a differently shaped or sized workpiece. The term "predetermined", as applied in the specification to the lateral relationship of channels 111, does not refer to a permanent spatial arrangement of the channels as in FIG. 2, but rather to the lateral relationship of the channels needed to capture a workpiece of predetermined shape for a given application.

Alignment frame 151 thus aligns the positioning of filaments 107 to provide a passageway 163 for workpiece 100 traveling along the length of a track 105' constructed with such alignment frames. This passageway 163 is defined, according to the requirements of a given workpiece, by the size and shape of opening 162 less the amount by which arms 155 and their corresponding filaments 107 overlap the opening 162 as seen in FIG. 9. The size and shape of passageway 163 in frame 151, relative to the path of workpiece 100, is not permanently defined as it is in frame 109. Rather, it is determined by the number and positioning of arms 155 with their corresponding filaments 107 and the circumferential size of opening 162 in plate 153. Since the shape of passageway 163 and the number and lateral positioning of channels 111 about its border are freely adjustable to accommodate a given workpiece within the size limits of opening 162, alignment frame 151 provides a structure which may be used in a "universal" track kit, in contrast to the single purpose, custom designed track frameworks of the prior art.

In the embodiments of the alignment frame illustrated in FIGS. 2 and 9, channels 111 are preferably constructed by drilling a hole at the desired channel location and cutting or grinding away a sufficient arc of the material surrounding the hole's circumference to create the desired C-shaped cross-section described above. By matching the diameter of the drilled hole to that of filament 107, a snug fit can be obtained which permits filaments 107 to be axially threaded through their respective channels 111 so long as the filaments are kept substantially straight while the threading action is taking place. By curving filaments 107 in the vicinity of channels 111, as by introducing a spiraling twist along the length of track 105, the filaments become mechanically wedged in their respective channels, thus locking the alignment frames at their respective positions along the track. This wedging action may be increased, if desired, by increasing the axial length of channels 111.

For example, frame 109 in FIG. 2 may be machined from a disc having greater thickness T to provide the desired increase in the length of channels 111 and correspondingly greater wedging power when filaments 107 are curved. Similarly, the thickness T of arms 155 of frame 151 in FIG. 10 may be increased to provide the same effect in that embodiment.

In applications where the shifting of frames 109 or 151 about track 105 is particularly troublesome, a drop of high viscosity Loctite TM or similar locking compound may be applied to one of the channels 111 in each alignment frame to lock the frame in place without substantially affecting the sliding friction of the track.

The preferred embodiment of track 105 includes filaments 107 made of hardened steel piano wire having a circular cross-section. While this wire is well adapted for use with the invention, and is easily available and relatively inexpensive, many other types and shapes of filament may be advantageously used with frames 109 or 151 to provide one or more of the features of track 105 discussed herein. In particular, a filament 107 and corresponding channel 111 need not be limited to the circular and C-shaped cross-sections of the preferred embodiment, so long as the channel restrains the lateral movement of the filament while permitting it to slide lengthwise or "thread" through the channel. For example, a filament shaped like a train rail may be used with a channel which conforms to the T-shaped base of the rail while permitting lengthwise sliding movement of the T-shaped portion through the channel. Such an embodiment would have the advantage that a substantial part of the rail would project out from the filament retaining channel, allowing the rail to reach into sharp inside corners of a workpiece which would be inaccessible with a circular filament.

What is claimed is:

1. A track for conveying workpieces of predetermined size and shape, comprising:
   a plurality of elongated filaments;
   means for aligning said filaments parallel to each other in a predetermined spatial relationship according to the size and shape of said workpieces, said means defining a passageway along the length of said apparatus through which said workpieces may travel while they are captured by said filaments;
   said alignment means comprising a plurality of alignment frames spaced along the length of said filaments, the number of said frames being dependent on the length of said filaments and the desired amount of curvature in said track along its length;
   said alignment frames each comprising a plate with a plurality of arms adjustably mounted relative to said plate, each of said arms having at least one filament retaining channel on its periphery, said channel shaped to slidably engage a corresponding one of said filaments along a portion of the filament's length while retaining the filament in the channel.

2. Apparatus as in claim 3, wherein said plate has an opening therethrough in the direction of travel of said workpieces, and said passageway is further defined, relative to the direction of travel of said workpieces through a given alignment frame, by the size and shape of said opening less the amount by which said arms overlap said opening when said arms are set in a predetermined position corresponding to the size and shape of said workpieces.

3. Apparatus as in claim 2 wherein each of said arms has an elongated slot cooperating with a pivotal member on said plate for adjusting the radial and circumferential positioning of the arm about said pivotal point.

4. Apparatus as in claim 3, wherein the length of said channels is selected according to the amount of curvature in said filaments when said track is interposed between feeding and receiving apparatus, so that said curvature causes said filaments to be wedged in their respective channels and hold said alignment frames at their respective positions along the length of said track.

5. Apparatus as in claim 4, wherein said filament retaining channels have substantially C-shaped cross-sections.

6. Apparatus as in claim 5, wherein said filaments are resilient.

7. Apparatus useful for aligning filaments to form a track for conveying workpieces, comprising:
an alignment frame including a plate with a plurality of arms adjustably mounted relative to said plate, each of said arms having at least one filament retaining channel on its periphery, said channels of said plurality of arms being aligned substantially parallel to each other in a predetermined spatial relationship, based on the size and shape of the workpieces to be conveyed;
said channels each having a cross-sectional shape and size selected to slidably retain a corresponding one of said filaments along a portion of the filament's length while fixing the lateral placement of the filament relative to the other filament retaining channels;
said frame shaped so as to form a passageway through which said workpieces can travel while sliding along the length of said filaments.

8. Apparatus as in claim 7, wherein said plate has an opening therethrough in the desired direction of travel of said workpieces, and said passageway is further defined, relative to the direction of travel of said workpieces through said alignment frame, by the size and shape of said opening less the amount by which said arms and their corresponding filaments overlap said opening when said arms are set in a predetermined position corresponding to the size and shape of said workpieces.

9. Apparatus as in claim 8 wherein each of said arms has an elongated slot cooperating with a pivotal member on said plate for adjusting the radial and circumferential positioning of the arm about said pivotal point.

10. Apparatus as in claim 9 wherein the length of said channels is selected according to the desired amount of curvature in said filaments, so that said curvature causes said filaments to be wedged in their respective channels and hold said alignment frame at its respective position along the length of said filaments.

11. Apparatus as in claim 10, wherein said filament retaining channels have substantially C-shaped cross-sections.

12. Apparatus for use with a classifying machine having a pair of facing, spaced-apart rollers along which workpieces may travel in a classifying operation, said apparatus comprising:
a track having a plurality of elongated filaments held substantially parallel to each other in a predetermined spatial relationship according to the size and shape of said workpieces, for conveying said workpieces along the length of said tracks, one of said filaments extending past the end of said tracks for use as a guide member for workpieces traveling along the rollers of said classifying machine; and
means for tensioning said extended portion of said one filament along the length of and between the rollers of said classifying machine and for positioning said extended portion of said filament at a position where it provides vertical support to a workpiece while the workpiece is seated in contact with the surfaces of the rollers of the classifying machine.

* * * * *